(12) United States Patent
Mackenzie et al.

(10) Patent No.: US 11,463,891 B2
(45) Date of Patent: Oct. 4, 2022

(54) METHOD AND APPARATUS FOR CONFIGURING MULTI-LEVEL CELLS OR CELL CLUSTERS AND COMMUNICATIONS SYSTEMS

(71) Applicant: British Telecommunications Public Limited Company, London (GB)

(72) Inventors: Richard Mackenzie, London (GB); Yang Yang, Beijing (CN); Mo Hao, Beijing (CN)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/336,256

(22) PCT Filed: Sep. 22, 2017

(86) PCT No.: PCT/EP2017/074059
§ 371 (c)(1),
(2) Date: Mar. 25, 2019

(87) PCT Pub. No.: WO2018/060092
PCT Pub. Date: Apr. 5, 2018

(65) Prior Publication Data
US 2019/0246284 A1   Aug. 8, 2019

(30) Foreign Application Priority Data

Sep. 30, 2016   (CN) .......................... 201610874455.5

(51) Int. Cl.
*H04W 16/32* (2009.01)
*H04W 16/10* (2009.01)
*H04W 92/20* (2009.01)

(52) U.S. Cl.
CPC ........... *H04W 16/32* (2013.01); *H04W 16/10* (2013.01); *H04W 92/20* (2013.01)

(58) Field of Classification Search
CPC .............................. H04W 16/32; H04W 16/10
See application file for complete search history.

(56) References Cited

U.S. PATENT DOCUMENTS

| 10,182,352 B2 | 1/2019 | Saffre et al. |
| 2008/0014954 A1 | 1/2008 | Matsumoto et al. |
| (Continued) | | |

FOREIGN PATENT DOCUMENTS

| CN | 101873602 A | 10/2010 |
| CN | 102006599 A | 4/2011 |
| (Continued) | | |

OTHER PUBLICATIONS

International Search Report and Written Opinion for corresponding PCT Application No. PCT/EP2017/074059, dated Nov. 29, 2017, 9 pages.

(Continued)

*Primary Examiner* — Jason E Mattis
(74) *Attorney, Agent, or Firm* — Patterson Thuente IP

(57) ABSTRACT

Embodiments of the present disclosure provide a method and apparatus for configuring multi-level cells or cell clusters and a communications system. The method includes: exchanging by a base station with one or more other base stations or cell cluster heads in the same level to obtain first information; receiving, by the base station, second information reported by one or more base stations or cell cluster heads in the lower level; configuring one or more cells in the lower level into a cell cluster by the base station according to the first information and the second information, and determining a cluster head of the cell cluster; and performing information transmission with the cluster head of the cell cluster. Hence, not only interference between equipment in the cell of the upper level and the cell cluster of the lower level but also interference between equipment out of the cell of the upper level and the cell cluster of the lower level are (Continued)

taken into account, thereby further reducing interference of the cells or cell clusters of various levels, and improving reliabilities and expandability of the cells or cell clusters.

15 Claims, 3 Drawing Sheets

(56) References Cited

U.S. PATENT DOCUMENTS

| | | | |
|---|---|---|---|
| 2009/0310545 | A1 | 12/2009 | Tateson et al. |
| 2010/0142454 | A1 | 6/2010 | Chang |
| 2010/0172754 | A1 | 7/2010 | Flanagan |
| 2011/0105138 | A1 | 5/2011 | Morimoto et al. |
| 2011/0274009 | A1 | 11/2011 | Cooper |
| 2011/0274101 | A1 | 11/2011 | Cooper |
| 2011/0294514 | A1 | 12/2011 | Kulkarni |
| 2013/0121191 | A1 | 5/2013 | Song et al. |
| 2013/0210447 | A1 | 8/2013 | Moe et al. |
| 2013/0322235 | A1 | 12/2013 | Khoryaev et al. |
| 2014/0128088 | A1 | 5/2014 | Farhadi |
| 2014/0198659 | A1 | 7/2014 | Vargas Bautista et al. |
| 2014/0235259 | A1 | 8/2014 | Salami et al. |
| 2015/0043390 | A1* | 2/2015 | Wang .......... H04W 24/02 370/280 |
| 2015/0085677 | A1 | 3/2015 | Pourahmadi et al. |
| 2015/0092627 | A1* | 4/2015 | Liu .......... H04B 7/2656 370/280 |
| 2015/0117327 | A1 | 4/2015 | Nordstrom et al. |
| 2015/0119057 | A1 | 4/2015 | Fujito |
| 2015/0173011 | A1 | 6/2015 | Das et al. |
| 2015/0215879 | A1 | 7/2015 | Zhu et al. |
| 2015/0365941 | A1 | 12/2015 | Liu et al. |
| 2015/0373550 | A1 | 12/2015 | Hong et al. |
| 2016/0007361 | A1* | 1/2016 | Andersson .......... H04W 72/042 370/329 |
| 2016/0037523 | A1 | 2/2016 | Wei et al. |
| 2016/0056907 | A1 | 2/2016 | Wei |
| 2016/0112177 | A1 | 4/2016 | Zheng et al. |
| 2016/0278100 | A1 | 9/2016 | Sawai |
| 2016/0360538 | A1 | 12/2016 | Jwa et al. |
| 2016/0374119 | A1 | 12/2016 | Choi et al. |
| 2017/0099617 | A1 | 4/2017 | Tomici |
| 2017/0265068 | A1 | 9/2017 | Cui et al. |
| 2018/0242392 | A1* | 8/2018 | Liu .......... H04L 45/125 |
| 2019/0215829 | A1 | 7/2019 | MacKenzie et al. |
| 2019/0223024 | A1 | 7/2019 | MacKenzie et al. |

FOREIGN PATENT DOCUMENTS

| | | |
|---|---|---|
| CN | 102131200 A | 7/2011 |
| CN | 102186174 A | 9/2011 |
| CN | 103338453 A | 10/2013 |
| CN | 103379498 A | 10/2013 |
| CN | 103442369 A | 12/2013 |
| CN | 104105174 A | 10/2014 |
| CN | 104159258 A | 11/2014 |
| CN | 104254081 A | 12/2014 |
| CN | 104918256 A | 9/2015 |
| CN | 104955077 A | 9/2015 |
| CN | 105101227 A | 11/2015 |
| CN | 105120467 A | 12/2015 |
| CN | 103442369 B | 4/2016 |
| CN | 105636066 A | 6/2016 |
| CN | 105813212 A | 7/2016 |
| CN | 104159258 B | 3/2018 |
| CN | 104254081 B | 5/2018 |
| EP | 2 779 728 A1 | 9/2014 |
| EP | 2 822 340 A1 | 1/2015 |
| EP | 2822340 B1 | 9/2016 |
| WO | WO 2012/139653 A1 | 10/2012 |
| WO | WO-2012159270 A1 | 11/2012 |
| WO | WO 2013/015255 A1 | 1/2013 |
| WO | WO 2013/075340 A1 | 5/2013 |
| WO | WO 2014/012192 A1 | 1/2014 |
| WO | WO-2014035415 A1 | 3/2014 |
| WO | WO-2014113941 A1 | 7/2014 |
| WO | WO 2014/179967 A1 | 11/2014 |

OTHER PUBLICATIONS

International Search Report and Written Opinion for corresponding PCT Application No. PCTEP2017/074083, dated Dec. 18, 2017, 14 pages.

International Search Report and Written Opinion for corresponding International Application No. PCT/EP2017/074132 dated Dec. 6, 2017; 12 pages.

International Preliminary Report on Patentability for corresponding International Application No. PCT/EP2015/067278 dated Oct. 12, 2016; 15 pages.

U.S. Appl. No. 16/336,304, filed Mar. 25, 2019, Inventor(s): MacKenzie et al.

U.S. Appl. No. 16/336,325, filed Mar. 25, 2019, Inventor(s): MacKenzie et al.

Application and Filing Receipt for U.S. Appl. No. 15/503,567, filed Feb. 13, 2017, Inventor(s): Saffre et al.

Hatoum et al., "FCRA: Femtocell Cluster-based Resource Allocation Scheme for OFDMA Networks"; ICC 2011—2011 IEEE International Conference on Communications—Jun. 5-9, 2011—Kyoto, Japan, IEEE, Piscataway, NJ, USA, pp. 1-6, XP031908466, DOI: 10.1109/ICC.2011.5962705, ISBN: 978-1-61284-232-5; 7 pages total.

Fan Song et al.: "A Clustering-Based Downlink Resource Allocation Algorithm For Small Cell Networks", 2015 International Conference On Wireless Communications & Signal Processing (WCSP), IEEE, Oct. 15, 2015 (Z815-10-15), pp. 1-5, XP832828554, DOI: 10. 1109/WCS P. 2015. 7341194, 5 pages total.

Potevio: "Consideration On The Informing Of Carrier Pattern In Carrier Based HetNet ICIC", 3GPP Draft; R3-112546, 3rd Generation Partnership Project (3GPP), Mobile Competence Centre ; 650, Route Des Lucioles ; F-06921 Sophia-Antipolis Cedex; France, vol. Ran WG3, No. Zhuhai; 20111010, Sep. 30, 2011 (Sep. 30, 2011), XP050542189 2 pages total.

Zubin Bharucha et al: "Dynamic Resource Partitioning for Downlink Femto-to-Macro-Cell Interference Avoidance", Eurasip Journal On Wireless Communications And Networking, vol. 8, No. 7, Jan. 1, 2010 (Jan. 1, 2010), p. 3498, XP055123525, ISSN: 1687-1499, DOI: 10.1155/2010/143413, 12 pages total.

Potevio: "Consideration of carrier pattern design for carrier based EICIC", 3GPP Draft; R3-112063, 3rd Generation Partnership Project (3GPP), Mobile Competence Centre; 650, Route Des Lucioles ; F-06921 Sophia-Antipolis Cedex, France, vol. Ran WG3, No. Athens, Greece; 20110822, Sep. 9, 2011 (Sep. 9, 2011), XP050541692, 3 pages total.

Ericsson: "DL Interference enhancements for Carrier-based HetNet ICIC", 3GPP Draft; R3-120728-DL-INTERFERENCE, $3^{RD}$ Generation Partnership Project (3GPP), Mobile Competence Centre; 650, Route Des Lucioles ; F-06921 Sophia-Antipolis Cedex, France, vol. Ran WG3, No. Cabo; 20120326-20120330, Apr. 2, 2012 (Apr. 2, 2012), XP050669079, Retrieved from the Internet: URL:http://www.3gpp.org/ftp/tsg ran/WG3Iu/TSGR375bisjDocsj, 3 pages total.

Laselva et al., "Self-Optimisation," LTE Self-Organising Networks (SON) Network Management Automation for Operational Efficiency, First Edition (2012) John Wiley & Sons, Ltd; p. 135-234, 100 pages total.

Liang et al., "Resource allocation with interference avoidance in OFDMA femotcell networks," IEEE Transactions on Vehicular Technology (2012) vol. 61, No. 5; p. 2243-2255, 13 pages total.

Shahid et al., "A decentralized heuristic approach towards resource allocation in femtocell networks," Entropy (2013) 15; p. 2524-2547, 24 pages total.

International Preliminary Report on Patentability, for corresponding PCT Application No. PCTEP2017/074083, dated Apr. 11, 2019, 11 pages.

International Preliminary Report on Patentability, Application No. PCT/EP2017/074059, dated Apr. 2, 2019, 11 pages.

(56) References Cited

OTHER PUBLICATIONS

International Preliminary Report on Patentability, for corresponding PCT Application No. PCTEP2017/074132, dated Apr. 2, 2019, 9 pages.
International Search Report and Written Opinion for corresponding International Application No. PCT/EP2015/067278 dated Oct. 5, 2016; 14 pages.
Communication pursuant to Article 94(3) EPC For EP Application No. 17772398.8, dated Jul. 20, 2020, 5 pages.
Communication pursuant to Article 94(3) EPC for EP Application No. 17777543.4, dated Dec. 10, 2020, 9 pages.
Communication pursuant to Article 94(3) EPC For EP Application No. 17780039.8, dated Dec. 11, 2020, 9 pages.
Extended European Search Report for Application No. EP14275174.2, dated Apr. 9, 2015, 7 pages.
Written Opinion of the International Preliminary Examining Authority for Application No. PCT/EP2015/067278, dated Jul. 25, 2016, 5 pages.
Broadcom Corporation "Interference Management for Small Cell Enhancements," 3GPP TSG RAN WG1 Meeting #72bis, R1-131474, Apr. 15-19, 2013, 4 pages.
Office Action for Chinese Application No. 201610874455.5, dated May 21, 2021, 11 pages.
Office Action for Chinese Application No. 201610875313.0, dated May 24, 2021, 14 pages.
Office Action for Chinese Application No. 201610875596.9, dated May 7, 2021, 11 pages.

\* cited by examiner

METHOD AND APPARATUS FOR CONFIGURING MULTI-LEVEL CELLS OR CELL CLUSTERS AND COMMUNICATIONS SYSTEMS

CROSS-REFERENCE TO RELATED APPLICATION

The present application claims priority to International Application No. PCT/EP2017/074059 filed Sep. 22, 2017, and Chinese Application No.: 201610874455.5 filed Sep. 30, 2016 which is hereby incorporated herein in its entirety by reference.

TECHNICAL FIELD

The present disclosure relates to the field of telecommunications, and in particular to a method and apparatus for configuring multi-level cells or cell clusters and a telecommunications system.

BACKGROUND

A Long-Term Evolution (LTE) or LTE-advanced (LTE-A) system is a technical specification for a mobile telecommunications system specified by the $3^{rd}$ Generation Partnership Project (3GPP) organization. Cellular wireless networks in accordance with the LTE/LTE-A system have a flatter system architecture than earlier generation cellular networks, which reduces delay (latency), and lowers network-establishing cost and maintenance cost.

In the LTE/LTE-A system, small cells (formed of small base stations) and a macro cell (formed of a macro base station) may be provided. While there are a plurality of small cells, each small cell has a relatively small coverage range (and therefore suitable, not least, for use indoors or outdoors and for dense deployment in a way that the ranges of each small cell overlap). The macro cell is relatively large in coverage range (and larger than that of a small cell) and is usually used outdoors. In the LTE/LTE-A system, the macro cell may achieve broad domain coverage, and the small cells may achieve hotspot coverage.

Currently, in order to solve a problem of interleaving (cell overlap) interference in a time division duplex (TDD) system, small cells may be divided into one or more clusters. For example, small cells generating serious interleaving interference are divided into the same cluster, and small base stations in the same cluster possess identical transmission directions at the same time, thereby avoiding interleaving interference.

It should be noted that the above description of the background is merely provided for clear and complete explanation of the present disclosure and for easy understanding by those skilled in the art, and it should not be understood that the above technical solution is known to those skilled in the art as it is described in the background of the present disclosure.

SUMMARY

Current deployments of small cell clusters only consider sub-frame interleaving interference of the TDD system and do not consider interference between equipment in the macro cell and the cell clusters, nor interference between equipment out of the macro cell and the cell clusters. Hence, there is a need to further reduce interference of the small cell clusters in the deployment structure.

Furthermore in the development of fifth generation (5G) communications systems, more and more attention is being focused on an Ultra-Dense Network (UDN). As more and more small cells are densely deployed, the reliability and expandability of small cell clusters need to be improved.

Embodiments of the present disclosure provide a method and apparatus for configuring multi-level cells or cell clusters and a communications system.

According to a first embodiment, there is provided a method for configuring multi-level cells or cell clusters, which configures a communications system into cells or cell clusters of at least three levels, the method including: exchanging by a base station with one or more other base stations or cell cluster heads in the same level to obtain first information; receiving, by the base station, second information reported by one or more base stations or cell cluster heads at a lower level; configuring one or more cells in the lower level into a cell cluster by the base station according to the first information and the second information, and determining a cluster head of the cell cluster; and performing information transmission by the base station with the cluster head of the cell cluster, and performing information transmission by the one or more cells in the lower level with the cluster head of the cell cluster.

According to a second embodiment, there is provided an apparatus for configuring multi-level cells or cell clusters, which configures a communications system into cells or cell clusters of at least three levels, the apparatus including: an information exchanging unit configured to exchange with one or more other base stations or cell cluster heads in the same level to obtain first information; an information receiving unit configured to receive second information reported by one or more base stations or cell cluster heads in the lower level; a cluster determining unit configured to configure one or more cells in the lower level into a cell cluster according to the first information and the second information, and determine a cluster head of the cell cluster; and an information transmitting unit configured to perform information transmission with the cluster head of the cell cluster, and the one or more cells in the lower level performing information transmission with the cluster head of the cell cluster.

According to a third embodiment, there is provided a communications system, which is configured with cells or cell clusters of at least three levels, the communications system at least including: an Nth-level cell or cell cluster, a cell base station or cluster head of which communicating with one or more (N+1)th-level cell cluster heads; one or more (N+1)th-level cell clusters, each of which having a cluster head, and resource allocation and/or information transmission being performed on one or more (N+2)th-level cells or cell clusters via the cluster head; wherein the (N+1)th-cell cluster is configured by the Nth-level cell base station or cell cluster head according to first information obtained by exchanging with one or more other Nth-level cell base stations or cell cluster heads and second information reported by one or more cell base stations or cell cluster heads in the lower level; and one or more (N+2)th-level cells or cell clusters, a cell base station or cell cluster head of each of which communicating with the (N+1)th-level cell base station or cell cluster head.

In an embodiment, the communications system is divided into at least three levels; and each cell cluster is formed by the first information obtained by exchanging by the base station with one or more other base stations or cell cluster heads in the same level and the second information reported by one or more base stations or cell cluster heads at a lower level, each cell cluster having a cluster head and performing resource allocation and/or information transmission to one or more cells at a lower level via the cluster head. Hence, not only interference between equipment in the cell of the upper level and the cell cluster of the lower level but also interference between equipment out of the cell of the upper level and the cell cluster of the lower level are taken into account, thereby further reducing interference of the cells or cell clusters of various levels, and improving reliabilities and expandability of the cells or cell clusters.

With reference to the following description and drawings, particular embodiments of the present disclosure are disclosed in detail, and principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Embodiments of the present disclosure will now be described with reference to the accompanying drawings in which.

DETAILED DESCRIPTION

Figure 1:
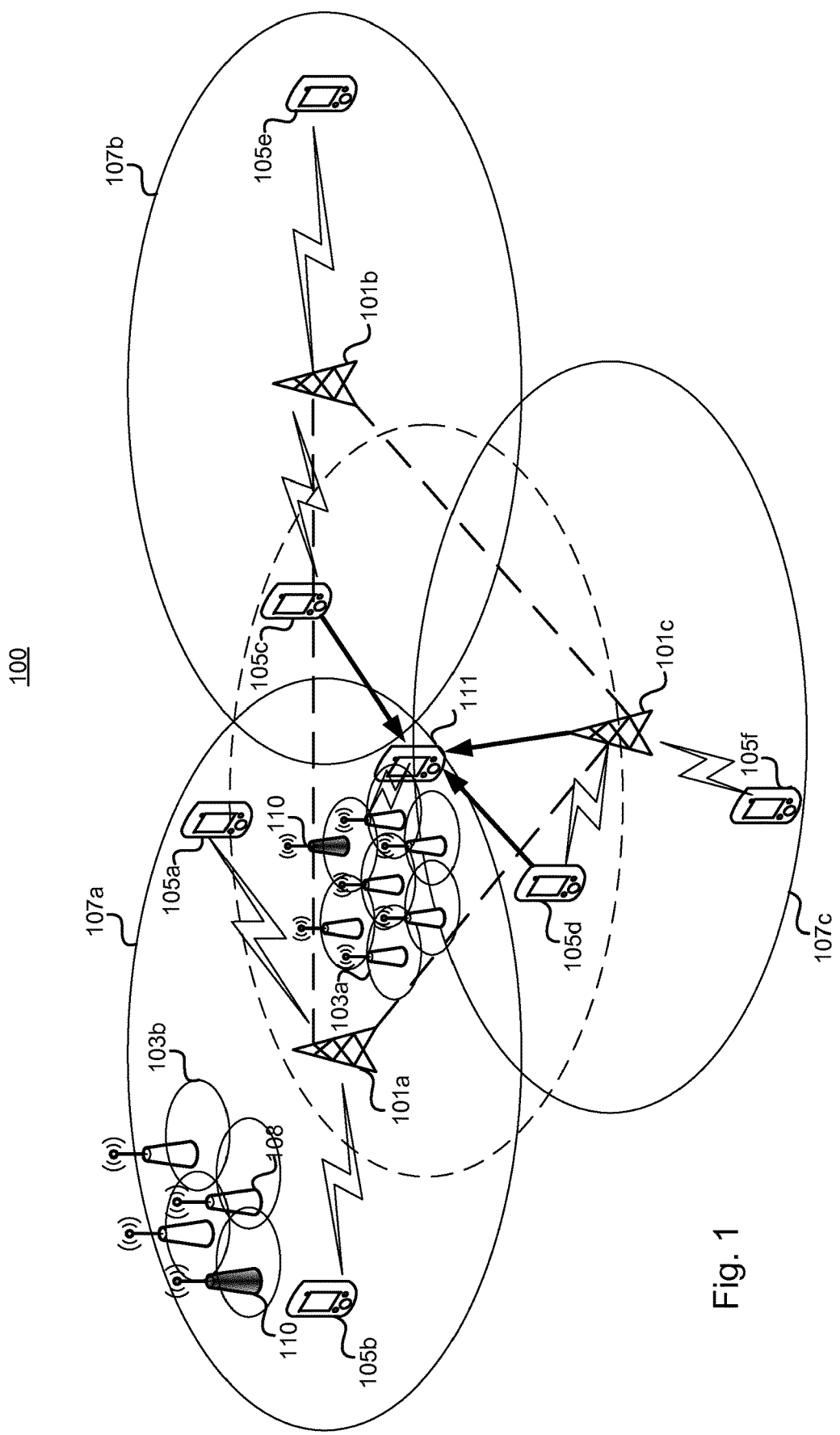
FIG. 1 is an exemplary diagram of the communications system in a first embodiment.

In the embodiments, as used herein, the term "base station" includes reference to a network entity that provides communication coverage for a specific geographical region, and may specifically include an access point, a broadcast transmitter, a transmitting and receiving point (TRP), a nodeB, or an evolved nodeB (eNB), or devices comprising some or all of the functions of the aforementioned. As used herein, the term "cell" may include reference to a base station and/or to a coverage region thereof, depending on context.

As used herein, a "mobile station" or "equipment" may include reference to user equipment (UE). The UE may be fixed or mobile, and may also be referred to as a mobile station, a terminal, an access terminal, a user unit, or a station, etc. The UE may be a cellular phone, a personal digital assistant (PDA), a wireless modem, a wireless communications device, a handhold device, a machine-type communications device, a lap-top computer, and a cordless telephone, etc.

The communications system of the embodiment of the present disclosure is configured with cells or cell clusters of at least three levels, and the communications system at least includes: an Nth-level cell or cell cluster, a cell base station or cluster head of which communicating with one or more (N+1)th-level cell cluster heads; one or more (N+1)th-level cell clusters, each of which having a cluster head, and resource allocation and/or information transmission being performed on one or more (N+2)th-level cells or cell clusters via the cluster head; wherein the (N+1)th-cell cluster is configured by the Nth-level cell base station or cell cluster head according to first information obtained by exchanging with one or more other Nth-level cell base stations or cell cluster heads and second information reported by one or more cell base stations or cell cluster heads in the lower level; and one or more (N+2)th-level cells or cell clusters, a cell base station or cell cluster head of each of which communicating with the (N+1)th-level cell base station or cell cluster head.

In this embodiment, N is a positive integer, and the communications system at least includes three levels. Furthermore, there may exist a level relationship between the multiple cell clusters. For example, for a cell, a cell cluster of lower level may be included, hence, the communications system may also be of a structure of more than three levels.

Taking a macro cell 107, a small cell cluster 103 and a small cell 108 as examples, one or more small cell clusters 103 may be included in a coverage range of a macro cell 107, and one or more pieces of macro user equipment (MCU) 105 may further be included in the coverage range of the macro cell 103. A small cell cluster 103 may include one or more small cells 108, one of which is configured as a cluster head 110, and one or more pieces of small user equipment (SCU) 111 may be included in a coverage range of each of the small cells.

The small cell cluster 103 is formed on the basis of: first information obtained by exchanging information via a macro base station 101 with one or more other macro base stations 101 (or one or more cell cluster heads 110 in the same level); and second information reported by one or more base stations 108 of small cells (or one or more cell cluster heads 110 in the same level), each small cell cluster 103 having a cluster head 110.

A macro base station (MBS) 101 of the macro cell 107 communicates with one or more small cell cluster heads 110 in a coverage range of the macro cell 107, and performs resource allocation and/or information transmission on one or more cells 108 via the one or more cluster heads 110. A small base station 108 of each small cell communicates with one or more pieces of small user equipment 111 within a coverage range of the small cell.

FIG. 1 shows an exemplary diagram of the communications system of a first embodiment. The communications system 100 includes: three macro cells 107a, 107b, 107c, which are formed by macro base stations MBS1 101a, MBS2 101b and MBS3 101c, respectively; two small cell clusters SSC1 103a and SSC2 103b. Each small cell cluster 103 is formed of small cells 108 one of which is designated as the cluster head 110 for the small cell cluster 103.

As shown in FIG. 1, the small cell clusters SCC1 103a and SCC2 103b, macro user equipment MCU1 105a and MCU2 105b are included in a macro cell 107a formed by the MBS1 101a; macro user equipment MCU3 105c and MCU5 105e are included in a macro cell 107b formed by the MBS2 101b; and macro user equipment MCU4 105d and MCU6 105f are included in a macro cell 107c formed by the MBS3 101c.

As shown in FIG. 1, the macro user equipment MCU1 105a, MCU3 105c and MCU4 105d are relatively close to the small cell cluster SCC1 103a. Therefore there may be relatively intense interference between these network components to the small cell cluster SCC1 103a and any connected SCU 111. The macro user equipment MCU2 105b, MCU5 105e and MCU6 105f are relatively far away from the small cell cluster SCC1 103a, so there will only be relatively weak interference or no interference. Furthermore, the macro base station MBS3 101c is relatively close to the small cell cluster SCC1 103a, so there may be relatively intense mutual interference.

Figure 2:
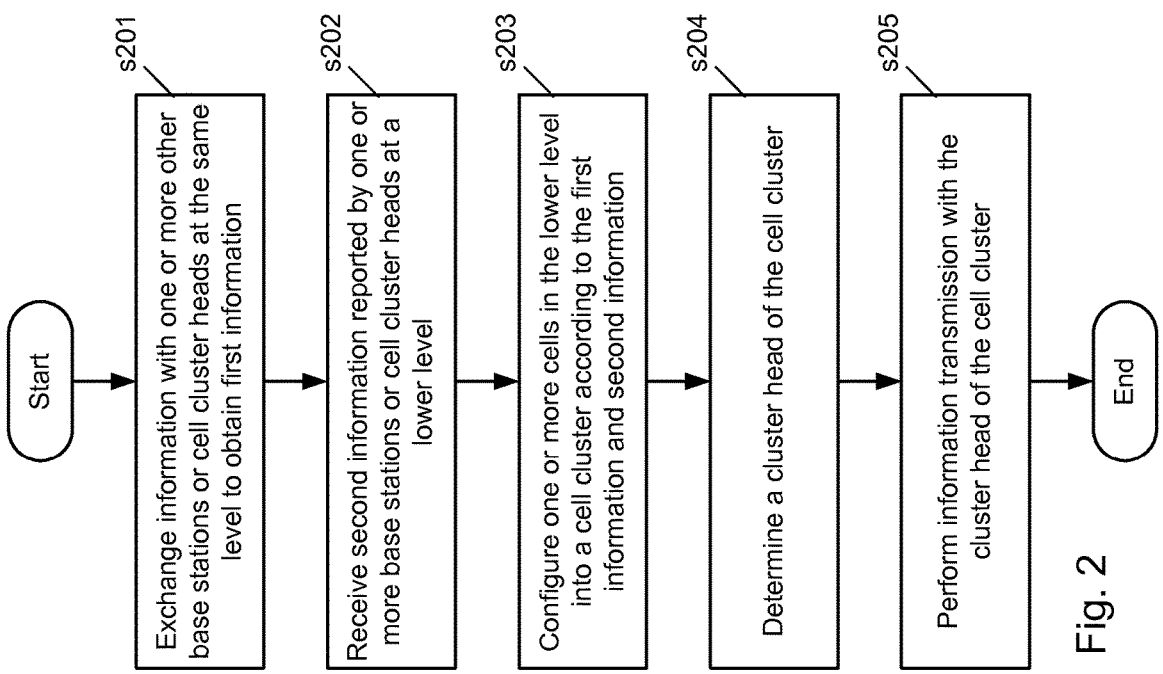
FIG. 2 is a flowchart of the method for configuring multi-level cells or cell clusters.

The method for configuring multi-level cells or cell clusters, which exemplarily describes formation and management of a cell cluster as performed by each macro bases station 101 will now be described. FIG. 2 is a flowchart of the method for configuring multi-level cells or cell clusters.

In s201, the base station 101 is configured to exchange with one or more other base stations 101 or cell cluster heads 110 in the same level to obtain first information.

In s202, the base station 101 is configured to receive second information reported by one or more base stations 101 or cell cluster heads 110 at a lower level.

In s203, the base station 101, 110 is configured to configure one or more cells 108 in the lower level into a cell cluster 103 according to the first information and the second information.

In s204, the base station determines a cluster head 110 of the cell cluster 103.

In s205, the base station is configured to perform information transmission with the cluster head 110 of the cell cluster 103.

Following the above processing by the base stations 101, the one or more cells 108 in the lower level perform information transmission with the cluster head 110 of the cell cluster 103.

For the sake of simplicity, following description shall be given taking N=1 as an example. For example, a first level is a macro cell 107 and a base station is a macro base station 101, a second level is a small cell cluster 103 and a base station is a cluster head 110 of the small cell cluster 103, and a third level is a small cell 108 and a base station is a small base station 108; however, the present invention is not limited thereto. Hence, embodiments of the present disclosure may form structures of various levels, and for a cell or a cell cluster of each level, management may be performed relatively independently.

In this embodiment, the macro base station 101 may exchange information with other macro base stations 101 via an interface between base stations 101 such as an X2 interface, and the macro base station 101 may also communicate with a small base station 108, 110 via an interface between base stations or an air interface.

In this embodiment, information exchange may always exist between the small cells and neighboring cells of the same levels, and information exchange may also always exist between upper-level cells and other upper-level cells of the same level, between cluster heads 110 and other cluster heads 110 of the same level and between cluster member cells and other cluster member cells of the same level.

In this embodiment, the first information may include one or more pieces of the following information:
information on a position of the other base station (such as a macro base station 101) or the cell cluster head 110;
information on signal strength of the other base station 101 or the cell cluster head 110;
information on resource allocation within a cell of the other base station (such as a macro base station 101) or the cell cluster head 110;
information on signal interference within the cell of the other base station (such as a macro base station 101) or the cell cluster head 110;
information on a position of user equipment within the cell of the other base station (such as a macro base station 101) or the cell cluster head 110;
information on signal strength of the user equipment within the cell of the other base station (such as a macro base station 101) or the cell cluster head 110.

Furthermore, the first information may include information on the cells or the cell cluster 103 within the cells of the other base station or the cell cluster head 110. For example, the second information collected by neighboring base stations or cell cluster heads 110 of the same level from respectively base stations or cell cluster heads 110 of the lower level.

The second information may include one or more pieces of the following information:
information on a position of the base station (such as a small base station 108) or the cell cluster head 110 of the lower level;
information on signal strength of the base station (such as a small base station 108) or the cell cluster head 110 of the lower level;
information on resource allocation within the cell (such as a small cell 108) or the cell cluster of the lower level, information on signal interference within the cell (such as a small cell) or the cell cluster 103 of the lower level;
information on a position of user equipment 111 within the cell (such as a small cell 108) or the cell cluster 103 of the lower level, and information on signal strength of the user equipment 111 within the cell (such as a small cell 108) or the cell cluster 103 of the lower level.

Furthermore, the second information may include information on the cells 108 or the cell cluster 103 within the cells of the other base stations or the cell cluster heads 110. For example, the second information collected by neighboring base stations or cell cluster heads 110 of the same level from respectively base stations or cell cluster heads 110 of the lower level.

In this embodiment, taking a macro cell 101 and small cells 108 as examples, the formation of the small cell cluster 103 is based not only on the first information between the macro base stations 101, but also the second information between the macro base stations 101 and the small base stations 108. Hence, not only interference between equipment in the macro cell 101 and the small cell cluster 103 but also interference between equipment out of the macro cell 101 and the small cell cluster 103 are taken into account, thereby further reducing interference of the cell clusters 103 from the deployment structure.

Furthermore, the macro base station 101 performs information transmission with and/or resource allocation for the cell cluster heads 110, that is, managing the cell clusters 103 via the cluster heads 110, thereby making each small cell cluster relatively independent, and improving reliability and expandability of the cell clusters 103.

In this embodiment, the macro base station 101 may select a small base station 108 in the small cell cluster 103 as the cluster head 110 of the small cell cluster 103. In this embodiment, the selection is performed according to a position of the small base station in the small cell cluster 103. For example: a small base station 108 relatively close to the macro base station 101 or a small base station 108 with a minimum average distance to the small base stations 108 in the small cell cluster 103 may be selected.

A formation process of a small cell cluster shall be described below taking how a small cell joins in the small cell cluster as an example.

Figure 3:
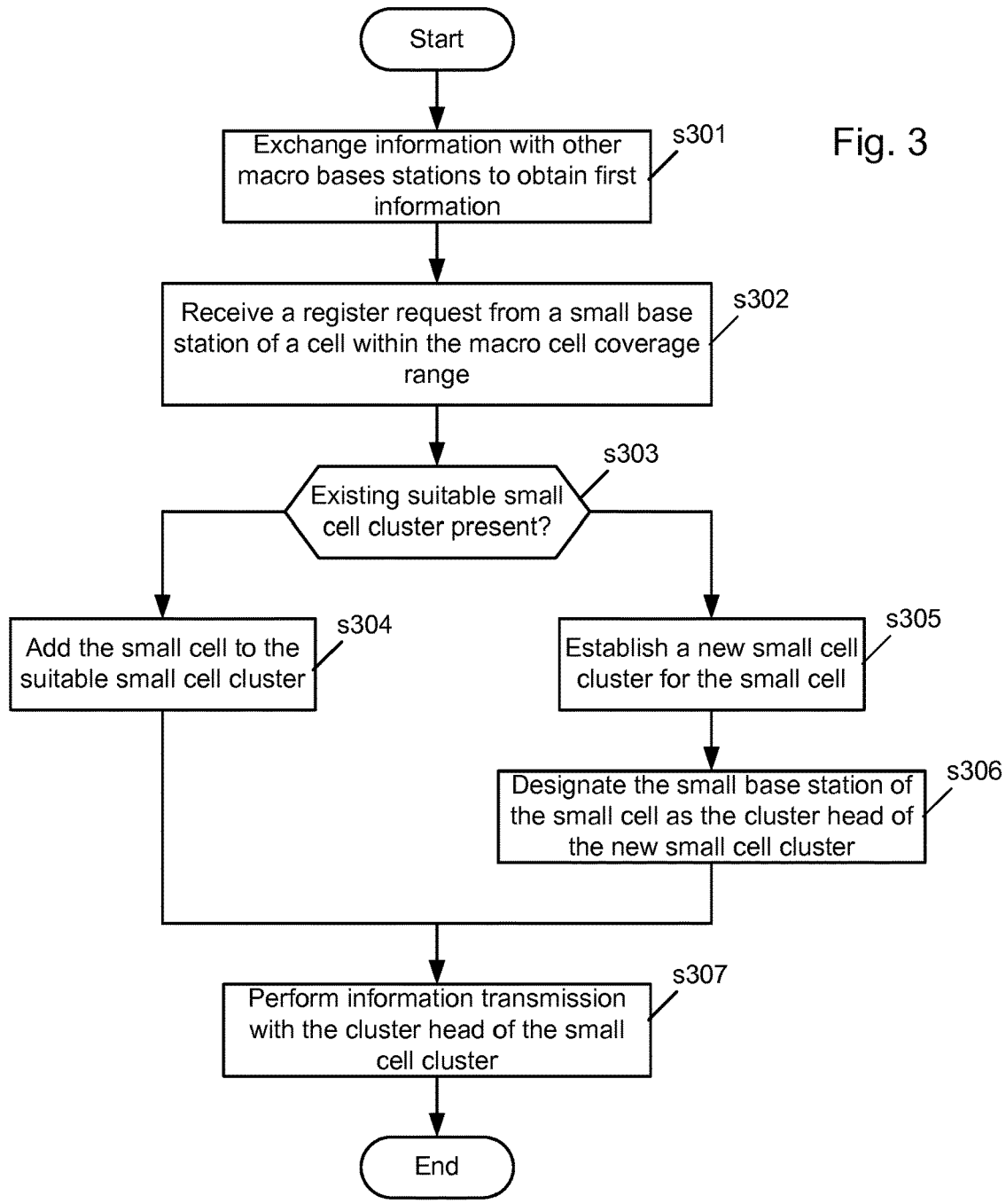
FIG. 3 is another flowchart of the method for configuring multi-level cells or cell clusters.

FIG. 3 is another flowchart of the method for configuring multi-level cells or cell clusters of the embodiment of the present disclosure, which shall be described from a base station side taking a macro base station, a small cell cluster and small cells as examples.

As shown in FIG. 3, the method for configuring small cell clusters includes, at s301, configuring the macro base station to exchange information with other macro base stations so as to obtain first information.

The macro base station may obtain first information in the form of a position or signal strength of user equipment within a macro cell coverage range formed by the other macro base station, so as to provide a reference for the formation of the small cell cluster.

In s302, the macro base station is configured to receive a register request reported by a small base station of a cell within the macro cell coverage range. The register request includes information on a position and/or information on signal strength of the small cell.

In this embodiment, after a small cell is started, a small base station of the cell will discover one or more surrounding macro cells based on, for example, a power level, or a physical cell identity (PCI), etc. For example, when a small base station of the small cell identifies a macro base station of a macro cell having maximum reference signal power, the small base station will send a register request to that macro base station.

When the small base station registers for the macro base station, it may report information regarding its position to the macro base station, using for example Global Positioning System (GPS) information, and/or report information on signal strength, such as reference signal received power (RSRP), or reference signal received quality (RSRQ).

In s303, the macro base station is configured to determine whether there is a suitable small cell cluster according to the first information and the register request sent by the small base station.

In this embodiment, the macro base station may look up existing small cell clusters according to various information (including the above first information and second information, but it is not limited thereto), so as to determine whether there exists a small cell cluster in the existing small cell clusters suitable for the small cell.

In some cases, the nearest small cell cluster is selected as a suitable small cell cluster. In an alternative, the selection is made to minimize interference, such that even though there are small cell clusters that are relatively near the small cell, the presence of macro user equipment of the other macro cell may lead to strong interference, so another small cell cluster that is relatively far away may be more suitable for the small cell.

If a suitable cell cluster is present, then in s304, the macro base station is configured to add the small cell into the suitable cell cluster.

In this embodiment, s304 includes the macro base station forwarding the register request to a cluster head of the suitable cell cluster, informing the cluster head that a new small cell will be joined in, transmitting cluster head information to the small cell and thereby registering the small cell in the cluster head of the suitable cell cluster. Additionally, necessary information exchange may also be performed between the small cell and the cluster head. Processing proceeds to s307.

Returning to s303, if an existing small cell cluster is not present, in s305, the macro base station is configured to establish a new small cell cluster for the small cell.

In s306, the macro base station is configured to designate the small base station of the small cell as the cluster head of the new small cell cluster.

Finally, in s307, the macro base station is configured to perform information transmission with the cluster head of the small cell cluster and processing ends.

After the small cell cluster is formed, the macro base station may further reorganize the existing cell cluster periodically or aperiodically. The reorganizing of the cell cluster may include one or more of the following operations: adding one or more new cells into the cell cluster; removing one or more cells from the cell cluster; reselecting a new cluster head for the cell cluster; and splitting the cell cluster into two or more cell clusters.

For example, for a macro base station 101 reallocation, the macro base station may directly notify a cluster head of a small cell cluster SCC1 103a that a small cell 108a is to be removed from the small cell cluster SCC1 101a. The macro base station 101a will also directly notify a cluster head of another small cell cluster SCC2 101b that the small cell 108a is to be added into the small cell cluster SCC2 103b.

In another case, if interference causes the signal strength between the macro base station and a cluster head SBS1 110 of a small cell cluster SCC1 103a to weaken, the macro base station may change the cluster head 110 of the small cell cluster SCC1 103a from a first small base station SBS1 108 to another base station SBS2 108 that provides a stronger signal strength.

In this embodiment, the cluster head 110 of a small cell cluster 103 may also transmit a reorganization request to the macro base station 101. For example, in a case where resource allocation of the small cell cluster 103 is insufficient, the macro base station 101 receiving a reorganization request sent by the cluster head, may reorganize the small cell cluster 103.

Furthermore, the macro base station 101 may also reorganize the small cell cluster according to information received from another macro base station 101 or a cluster head 110 of a small cell cluster 103. Besides the above reorganization request, the received information may further include: network state information transmitted by the other base station; and network state information transmitted by another cluster head, etc.

In this embodiment, the macro base station may allocate resources for a small cell cluster according to information on resource allocation of another macro base station and information on resource allocation of macro user equipment or other small cell clusters within the coverage range of the macro base station, and transmit the information on resource allocation to a cluster head of the small cell cluster.

For example, resources with relatively small interference (such as orthogonal in a time domain, a frequency domain or a spatial domain) with other equipment (such as macro user equipment, small cells and small cell clusters within the macro cell, and macro user equipment, small cells and small cell clusters within another macro cell) may be selected according to the information on resource allocation, and are transmitted to the cluster head of the small cell cluster.

Figure 4:
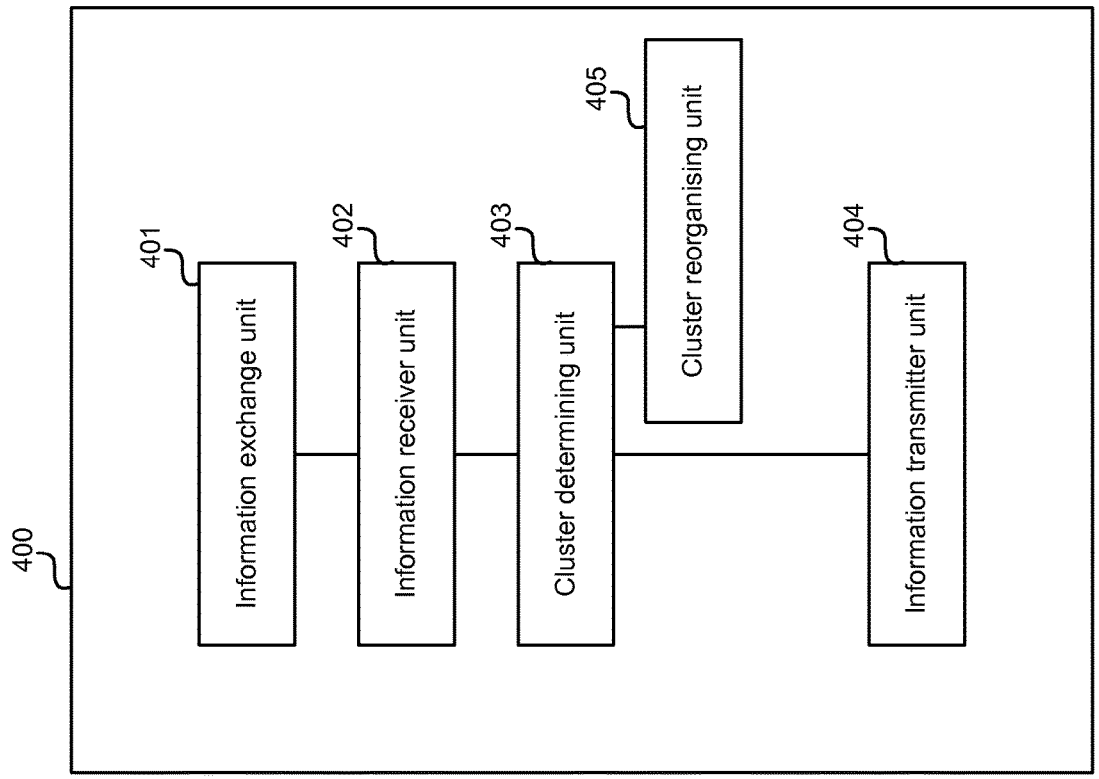
FIG. 4 is a schematic diagram of the apparatus for configuring multi-level cells or cell clusters.

FIG. 4 is a schematic diagram of the apparatus for configuring multi-level cells or cell clusters of the embodiment of the present disclosure. As shown in FIG. 4, the apparatus 400 for configuring multi-level cells or cell clusters includes: an information exchanging unit 401 configured to exchange with one or more other base stations or cell cluster heads in the same level to obtain first information; an information receiver unit 402 configured to receive second information reported by one or more base stations or cell cluster heads in the lower level; a cluster determining unit 403 configured to configure one or more cells in the lower level into a cell cluster according to the first information and the second information, and determine a cluster head of the cell cluster; a cluster reorganizing unit 405 configured to reorganize the cell cluster periodically or aperiodically; and an information transmitter unit 404 configured to perform information transmission with the cluster head of the cell cluster, and the one or more cells in the lower level perform information transmission with the cluster head of the cell cluster.

In this embodiment, the information receiver unit 402 may further be configured to receive a register request reported by a base station of a cell in the lower level within coverage of the cell or out of the coverage of the cell. The register request includes information on a position and/or information on signal strength of the cell in the lower level.

In this embodiment, the cluster determining unit 403 may further be configured to select a base station in the cell cluster at the lower level as the cluster head of the cell cluster.

The cluster determining unit 403 may further be configured to determine a suitable cell cluster for the cell in the lower level according to the first information and the register request, and add the cell in the lower level into the suitable cell cluster. Furthermore, the cluster determining unit 403 may be configured to establish a new cell cluster for the cell in the lower level when there is no suitable cell cluster, and take the base station of the cell in the lower level as a cluster head of the new cell cluster.

The cluster reorganizing unit 405 may further be configured to reorganize the cell cluster according to information received from one or more other base stations or cell cluster heads.

The operations for reorganizing the cell cluster may include one or more of the following operations: adding one or more new cells into the cell cluster; removing one or more cells from the cell cluster; reselecting a new cluster head for the cell cluster; and splitting the cell cluster into two or more cell clusters.

The above information may include one or more pieces of the following information: the reorganization request transmitted by the cluster head of the cell cluster; network state information transmitted by the other base station; and network state information transmitted by a cluster head of the other cell cluster, etc.

It can be seen from the above embodiment that the communications system may be divided into at least three levels; and each cell cluster is formed by the first information obtained by exchanging by the base station with one or more other base stations or cell cluster heads in the same level and the second information reported by one or more base stations or cell cluster heads at a lower level, each cell cluster having a cluster head and performing resource allocation or information transmission to one or more cells at a lower level via the cluster head. Hence, not only interference between equipment in the cell of the upper level and the cell or cell cluster of the lower level but also interference between equipment out of the cell of the upper level and the cell or cell cluster of the lower level are taken into account, thereby further reducing interference of the cells or cell clusters of various levels, and improving reliabilities and expandability of the cells or cell clusters.

Figure 5:
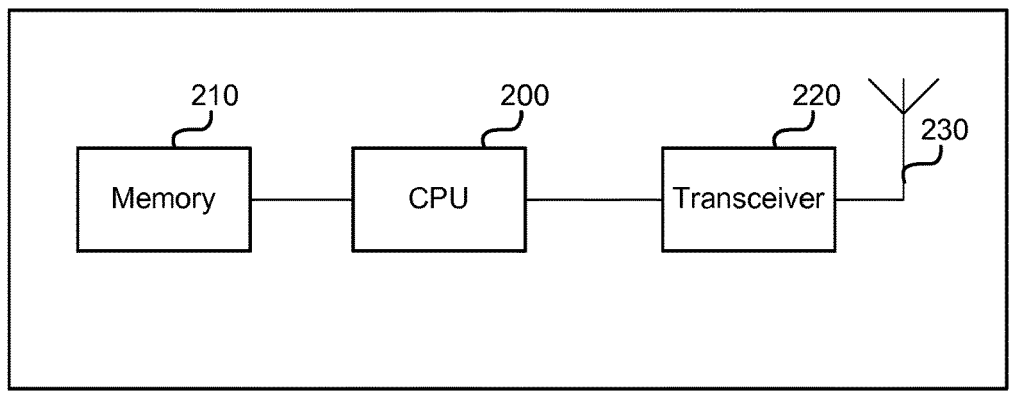
FIG. 5 is a schematic diagram of a base station.

FIG. 5 is a schematic diagram of the base station of the embodiment of the present invention. The base station 101 includes a central processing unit (CPU) 200 and a memory 210, the memory 210 being coupled to the central processing unit 200. The memory 210 stores various data, including a program for information processing, the program being executable under control of the central processing unit 200.

For example, the central processing unit 200 may be configured to perform the following control: exchanging with one or more other base stations or cell cluster heads in the same level to obtain first information; receiving second information reported by one or more base stations or cell cluster heads at a lower level; configuring one or more cells in the lower level into a cell cluster according to the first information and the second information, and determining a cluster head of the cell cluster; and performing information transmission with the cluster head of the cell cluster, and the one or more cells in the lower level perform information transmission with the cluster head of the cell cluster.

The base station 101 further includes a transceiver 220, and an antenna 230. The functions of the above components are similar to those in the related art, and shall not be described herein any further.

It can be seen from the above embodiment that the communications system may be divided into at least three levels; and each cell cluster is formed by the first information obtained by exchanging by the base station with one or more other base stations or cell cluster heads in the same level and the second information reported by one or more base stations or cell cluster heads at a lower level, each cell cluster having a cluster head and performing resource allocation or information transmission to one or more cells at a lower level via the cluster head. Hence, not only interference between equipment in the cell of the upper level and the cell or cell cluster of the lower level but also interference between equipment out of the cell of the upper level and the cell or cell cluster of the lower level are taken into account, thereby further reducing interference of the cells or cell clusters of various levels, and improving reliabilities and expandability of the cells or cell clusters.

The method of FIGS. 2 and 3 may be embodied as a computer-readable program, wherein when the program is executed in an apparatus for configuring multi-level cells or cell clusters or a base station, the program enables the apparatus for configuring multi-level cells or cell clusters or the base station to carry out the method for configuring multi-level cells or cell clusters as described in the embodiment.

The computer implementable instructions for carrying out the method shown in FIGS. 2 and 3 may be embodied as a storage medium in which a computer-readable program is stored, wherein the computer-readable program enables an apparatus for configuring multi-level cells or cell clusters or a base station to carry out the method for configuring multi-level cells or cell clusters as described in the embodiment.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The method/apparatus described with reference to the embodiments of the present disclosure may be directly embodied as hardware, a software module executed by a processor, or a combination thereof. For example, one or more of the block diagrams and/or one or more combinations of the block diagrams shown in FIG. 4 (such as the information exchanging unit, the information receiving unit, the cluster determining unit, and the information transmitting unit, etc.) may correspond to soft modules of a process of a computer program, and may also correspond to hardware modules. The soft modules may correspond to the steps shown in FIG. 2, respectively.

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

ALTERNATIVES AND MODIFICATIONS

In the embodiments, a communication having three levels was described. However, the number of levels is not limited thereto; for example, it may also be a structure of more than three levels. For example, there exists a level relationship between the multiple small cell clusters, that is, for a small cell, a small cell cluster of a lower level may be included.

In the embodiments, an LTE/LTE-A system(s) is described as an example(s). Such technologies as orthogonal frequency division multiplexing (OFDM), and multiple input multiple output (MIMO), etc., may be used. Other communications systems may be included, or other communications technologies may be used. Furthermore, in an alternative, the clusters are applicable to a TDD system, and may also be applicable to a frequency division duplex (FDD) system.

In the embodiments, a small base station is selected based on the proximity to the macro base station. Alternatively, the selection may be performed according to signal strength of the small base stations 108 in the small cell cluster 103. For example, a small base station 108 with maximum signal strength between it and the macro base station 101 may be selected or a small base station 108 with maximum average signal strength with the small base stations 108 in the small cell cluster 103 may be selected.

As a further alternative, the selection may be performed according to a temporal order of joining in the small cell cluster 103. For example, a small base station 108 joining in the small cell cluster 103 earliest may be selected.

In a yet further alternative, a small base station 103 may be selected randomly.

In the embodiments, the small cells forming the small cell cluster belong to the same cell 107. All the small cells forming the small cell cluster SCC1 103a shown in FIG. 1 belong to the macro cell 107a of the macro base station MBS1 101a.

In some cases, the small cells forming the small cell cluster may not belong to the same cell. For example, part of the small cells forming the small cell cluster SCC1 shown in FIG. 1 may belong to the macro cell of the macro base station MBS1, and the other part may belong to the macro cell of the macro base station MBS2.

The cell cluster may be formed of cells (such as small cells) of different cells (such as different macro cells), for example, the cell cluster may be formed spanning the macro cells. Particular members of the cell cluster and a base station of an upper level to which the cluster head belongs may be determined by base stations of the upper level through negotiation.

In a region where coverage ranges of two macro base stations overlap, the two related macro base stations may determine which small cells belong to a small cell cluster in the overlapped range via the information exchanged between them, and determine which of the two macro base stations controls a cluster head of the small cell cluster.

CLAUSES

For implementations of the present disclosure containing the above embodiments, following supplements are further disclosed.

Supplement 1. A method for configuring multi-level cells or cell clusters, characterized in that the method configures a communications system into cells or cell clusters of at least three levels, and the method includes: exchanging by a base station with one or more other base stations or cell cluster heads in the same level to obtain first information; receiving, by the base station, second information reported by one or more base stations or cell cluster heads at a lower level; configuring one or more cells in the lower level into a cell cluster by the base station according to the first information and the second information, and determining a cluster head of the cell cluster; and performing information transmission by the base station with the cluster head of the cell cluster, and the one or more cells in the lower level perform information transmission with the cluster head of the cell cluster.

Supplement 2. The method according to supplement 1, wherein the first information includes one or more pieces of the following information: information on a position of the other base station or the cell cluster head, information on signal strength of the other base station or the cell cluster head, information on resource allocation within a cell of the other base station or the cell cluster head, information on signal interference within the cell of the other base station or the cell cluster head, information on a position of user equipment within the cell of the other base station or the cell cluster head, information on signal strength of the user equipment within the cell of the other base station or the cell cluster head, and information on the cells or cell cluster within the cells of the other base station or the cell cluster head; and the second information includes one or more pieces of the following information: information on a position of the base station or the cell cluster head in the lower level, information on signal strength of the base station or the cell cluster head in the lower level, information on resource allocation within the cell of the base station or the cell cluster head in the lower level, information on signal interference within the cell of the base station or the cell cluster head in the lower level, information on a position of user equipment within cell of the base station or the cell cluster head in the lower level, and information on signal strength of the user equipment within the cell of the base station or the cell cluster head in the lower level.

Supplement 3. The method according to supplement 1, wherein the base station selects a base station in the lower level as the cluster head of the cell cluster.

Supplement 4. The method according to supplement 1, wherein the receiving, by the base station, second information reported by one or more base stations or cell cluster heads in the lower level, includes: receiving, by the base station, a register request reported by a base station of a cell in the lower level within coverage of the cell or out of the coverage of the cell; wherein the register request includes information on a position and/or information on signal strength of the cell in the lower level.

Supplement 5. The method according to supplement 4, wherein the configuring one or more cells in the lower level into a cell cluster by the base station according to the first information and the second information, includes: determining, by the base station, a suitable cell cluster for the cell in the lower level according to the first information and the register request; and adding the cell in the lower level into the suitable cell cluster.

Supplement 6. The method according to supplement 5, wherein when there is no suitable cell cluster, the base station establishes a new cell cluster for the cell in the lower level, and takes the base station of the cell in the lower level as a cluster head of the new cell cluster.

Supplement 7. The method according to supplement 1, wherein the method further includes: reorganizing the cell cluster periodically or aperiodically by the base station.

Supplement 8. The method according to supplement 7, wherein the reorganizing the cell cluster includes one or more of the following operations: adding one or more new cells into the cell cluster, removing one or more cells from the cell cluster, reselecting a new cluster head for the cell cluster, and splitting the cell cluster into two or more cell clusters.

Supplement 9. The method according to supplement 7, wherein the method further includes: reorganizing the cell cluster by the base station according to information received from one or more other base stations or cell cluster heads.

Supplement 10. The method according to supplement 9, wherein the information includes one or more of the following: a reorganization request transmitted by the cell cluster head, network state information transmitted by the other base station, and network state information transmitted by the other cell cluster head.

Supplement 11. An apparatus for configuring multi-level cells or cell clusters, characterized in that the apparatus configures a communications system into cells or cell clusters of at least three levels, and the apparatus includes: an information exchanging unit configured to exchange with one or more other base stations or cell cluster heads in the same level to obtain first information; an information receiving unit configured to receive second information reported by one or more base stations or cell cluster heads in the lower level; a cluster determining unit configured to configure one or more cells in the lower level into a cell cluster according to the first information and the second information, and determine a cluster head of the cell cluster; and an information transmitting unit configured to perform information transmission with the cluster head of the cell cluster, and the one or more cells in the lower level perform information transmission with the cluster head of the cell cluster.

Supplement 12. The apparatus according to supplement 11, wherein the first information includes one or more pieces of the following information: information on a position of the other base station or cell cluster head, information on signal strength of the other base station or cell cluster head, information on resource allocation within a cell of the other base station or cell cluster head, information on signal interference within the cell of the other base station or cell cluster head, information on a position of user equipment within the cell of the other base station or cell cluster head, information on signal strength of the user equipment within the cell of the other base station or cell cluster head, and information on the cell cluster within the cell of the other base station or cell cluster head; and the second information includes one or more pieces of the following information: information on a position of the base station or the cell cluster head in the lower level, information on signal strength of the base station or the cell cluster head in the lower level, information on resource allocation within the cell of the base station or the cell cluster head in the lower level, information on signal interference within the cell of the base station or the cell cluster head in the lower level, information on a position of user equipment within cell of the base station or the cell cluster head in the lower level, and information on signal strength of the user equipment within the cell of the base station or the cell cluster head in the lower level.

Supplement 13. The apparatus according to supplement 11, wherein the base station selects a base station in the lower level as the cluster head of the small cell cluster.

Supplement 14. The apparatus according to supplement 11, wherein the information receiving unit is configured to receive a register request reported by a base station of a cell in the lower level within or out of the cell coverage range; wherein the register request includes information on a position and/or information on signal strength of the cell in the lower level.

Supplement 15. The apparatus according to supplement 14, wherein the cluster determining unit is further configured to determine a suitable cell cluster for the cell in the lower level according to the first information and the register request, and add the cell in the lower level into the suitable cell cluster.

Supplement 16. The apparatus according to supplement 15, wherein the cluster determining unit is further configured to establish a new cell cluster for the cell in the lower level when there is no suitable cell cluster, and take the base station of the cell in the lower level as a cluster head of the new cell cluster.

Supplement 17. The apparatus according to supplement 11, wherein the apparatus further includes: a cluster reorganizing unit configured to reorganize the cell cluster periodically or aperiodically.

Supplement 18. The apparatus according to supplement 17, wherein the reorganizing the cell cluster includes one or more of the following operations: adding one or more new cells into the cell cluster, removing one or more cells from the cell cluster, reselecting a new cluster head for the cell cluster, and splitting the cell cluster into two or more cell clusters.

Supplement 19. The apparatus according to supplement 17, wherein the cluster reorganizing unit is further configured to reorganize the cell cluster according to information received from one or more other base stations or cell cluster heads.

Supplement 20. The apparatus according to supplement 19, wherein the information includes one or more of the following: a reorganization request transmitted by the cell cluster head, network state information transmitted by the other base station, and network state information transmitted by the other cell cluster head.

Supplement 21. A communications system, characterized in that the communications system is configured with cells or cell clusters of at least three levels, and the communications system at least includes: an Nth-level cell or cell cluster, a cell base station or cluster head of which communicating with one or more (N+1)th-level cell cluster heads; one or more (N+1)th-level cell clusters, each of which having a cluster head, and resource allocation and/or information transmission being performed on one or more (N+2)th-level cells or cell clusters via the cluster head; wherein the (N+1)th-cell cluster is configured by the Nth-level cell base station or cell cluster head according to first information obtained by exchanging with one or more other Nth-level cell base stations or cell cluster heads and second information reported by one or more cell base stations or cell cluster heads in the lower level; and one or more (N+2)th-level cells or cell clusters, a cell base station or cell cluster head of each of which communicating with the (N+1)th-level cell base station or cell cluster head.

The invention claimed is:

1. A method for configuring multi-level cells or cell clusters, wherein the method configures a communications system into cells or cell clusters of at least three levels, and the method comprises:
 exchanging by a base station with one or more other base stations or one or more cell cluster heads in a same level to obtain first information, the first information comprising: resource allocation information within a cell of the one or more other base stations or the one or more cell cluster heads, and information on a position of the one or more other base stations or the one or more cell cluster heads;
 receiving, by the base station, second information reported by one or more base stations or one or more cell cluster heads at a lower level;
 configuring one or more cells in the lower level into a cell cluster by the base station according to the first information and the second information, and determining a cluster head of the cell cluster; and
 performing information transmission by the base station with the cluster head of the cell cluster, and the one or more cells in the lower level performing information transmission with the cluster head of the cell cluster.

2. The method according to claim 1, wherein the first information further comprises one or more pieces of the following information:
 information on signal strength of the other base station or the cell cluster head;
 information on signal interference within the cell of the other base station or the cell cluster head;
 information on a position of user equipment within the cell of the other base station or the cell cluster head;
 information on signal strength of the user equipment within the cell of the other base station or the cell cluster head; and
 information on the cells or cell cluster within the cells of the other base station or the cell cluster head;
 and the second information comprises one or more pieces of the following information:
 information on a position of the base station or the cell cluster head in the lower level;
 information on signal strength of the base station or the cell cluster head in the lower level;
 information on resource allocation within the cell of the base station or the cell cluster head in the lower level;
 information on signal interference within the cell of the base station or the cell cluster head in the lower level;
 information on a position of user equipment within the cell of the base station or the cell cluster head in the lower level; and
 information on signal strength of the user equipment within the cell of the base station or the cell cluster head in the lower level.

3. The method according to claim 1, wherein the base station selects a base station in the lower level as the cluster head of the cell cluster.

4. The method according to claim 1, wherein the receiving, by the base station, of the second information reported by one or more base stations or one or more cell cluster heads in the lower level, comprises:
 receiving, by the base station, a register request reported by a base station of a cell in the lower level within coverage of the cell or out of coverage of the cell, and wherein the register request comprises at least one of information on a position or information on signal strength of the cell in the lower level.

5. The method according to claim 4, wherein the configuring one or more cells in the lower level into a cell cluster by the base station according to the first information and the second information, comprises:
 determining, by the base station, a suitable cell cluster for the cell in the lower level according to the first information and the register request; and
 adding the cell in the lower level into the suitable cell cluster.

6. The method according to claim 1, wherein when there is no suitable cell cluster, the base station establishes a new cell cluster for the cell in the lower level, and takes the base station of the cell in the lower level as a cluster head of the new cell cluster.

7. The method according to claim 1, wherein the method further comprises reorganizing the cell cluster periodically or aperiodically by the base station.

8. The method according to claim 7, wherein the reorganizing of the cell cluster comprises one or more of the following operations:
 adding one or more new cells into the cell cluster;
 removing one or more cells from the cell cluster;

reselecting a new cluster head for the cell cluster; and
splitting the cell cluster into two or more cell clusters.

9. The method according to claim 7, wherein the method further comprises reorganizing the cell cluster by the base station according to information received from one or more other base stations or one or more cell cluster heads.

10. The method according to claim 9, wherein the information comprises one or more of the following:
   a reorganization request transmitted by the cluster head of the cell cluster;
   network state information transmitted by the other base station; and
   network state information transmitted by the other cell cluster head.

11. An apparatus for configuring multi-level cells or cell clusters, wherein the apparatus configures a communications system into cells or cell clusters of at least three levels, and the apparatus comprises:
   an information exchanging unit configured to exchange with one or more other base stations or one or more cell cluster heads in a same level to obtain first information, the first information comprising: resource allocation information within a cell of the one or more other base stations or the one or more cell cluster heads, and information on a position of the one or more other base stations or the one or more cell cluster heads;
   an information receiving unit configured to receive second information reported by one or more base stations or one or more cell cluster heads in a lower level;
   a cluster determining unit configured to configure one or more cells in the lower level into a cell cluster according to the first information and the second information, and determine a cluster head of the cell cluster; and
   an information transmitting unit configured to perform information transmission with the cluster head of the cell cluster, and the one or more cells in the lower level perform information transmission with the cluster head of the cell cluster.

12. The apparatus according to claim 11, wherein the first information comprises one or more pieces of the following information:
   information on signal strength of the other base station or cell cluster head;
   information on signal interference within the cell of the other base station or cell cluster head;
   information on a position of user equipment within the cell of the other base station or cell cluster head;
   information on signal strength of the user equipment within the cell of the other base station or cell cluster head; and
   information on the cell cluster within the cell of the other base station or cell cluster head;
   and the second information comprises one or more pieces of the following information:
   information on a position of the base station or the cell cluster head in the lower level;
   information on signal strength of the base station or the cell cluster head in the lower level;
   information on resource allocation within the cell of the base station or the cell cluster head in the lower level;
   information on signal interference within the cell of the base station or the cell cluster head in the lower level;
   information on a position of user equipment within the cell of the base station or the cell cluster head in the lower level; and
   information on signal strength of the user equipment within the cell of the base station or the cell cluster head in the lower level.

13. The apparatus according to claim 11, wherein the apparatus further comprises:
   a cluster reorganizing unit configured to do at least one of:
      reorganize the cell cluster periodically or aperiodically; or
      reorganize the cell cluster according to information received from one or more other base stations or one or more cell cluster heads.

14. The apparatus according to claim 13, wherein the reorganizing the cell cluster comprises one or more of the following operations:
   adding one or more new cells into the cell cluster;
   removing one or more cells from the cell cluster;
   reselecting a new cluster head for the cell cluster; and
   splitting the cell cluster into two or more cell clusters.

15. A communications system having cells or cell clusters of at least three levels, the communications system comprising:
   an Nth-level cell or cell cluster;
   a cell base station or cell cluster head for communicating with one or more (N+1)th-level cell or one or more cell cluster heads;
   one or more (N+1)th-level cells or cell clusters, each of the one or more (N+1)th-level cells or cell clusters having a cluster head, and at least one of resource allocation or information transmission being performed on one or more (N+2)th-level cells or cell clusters via the cluster head, wherein the (N+1)th-cell cluster is configured by the Nth-level cell base station or cell cluster head according to first information obtained by exchanging with one or more other Nth-level cell base stations or one or more cell cluster heads, wherein the first information comprises resource allocation information within a cell of the other Nth-level cell base stations or the one or more cell cluster heads and information on a position of the one or more other base stations or the one or more cell cluster heads, and second information reported by one or more cell base stations or one or more cell cluster heads in the lower level;
   one or more (N+2)th-level cells or cell clusters; and
   a cell base station or cell cluster head for communicating with at least one of the (N+1)th-level cell base stations or the one or more cell cluster heads.

* * * * *